(12) United States Patent
Takamatsu et al.

(10) Patent No.: US 8,060,146 B2
(45) Date of Patent: Nov. 15, 2011

(54) BASE STATION DEVICE AND BASE STATION DEVICE INSTALLATION ERROR DETECTION METHOD

(75) Inventors: Nobuaki Takamatsu, Kanagawa (JP); Shiro Ohmasa, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 392 days.

(21) Appl. No.: 12/294,607

(22) PCT Filed: Mar. 23, 2007

(86) PCT No.: PCT/JP2007/055978
§ 371 (c)(1),
(2), (4) Date: Sep. 25, 2008

(87) PCT Pub. No.: WO2007/116645
PCT Pub. Date: Oct. 18, 2007

(65) Prior Publication Data
US 2009/0233645 A1 Sep. 17, 2009

(30) Foreign Application Priority Data
Mar. 28, 2006 (JP) .................................. 2006-089442

(51) Int. Cl.
*H04B 1/38* (2006.01)
*G01C 17/38* (2006.01)
*H01Q 3/00* (2006.01)

(52) U.S. Cl. ..................... 455/561; 342/359; 455/562.1; 702/92; 702/94

(58) Field of Classification Search .......... 73/52, 382 R, 73/383; 340/3.1, 506, 511, 521, 524, 572.1; 342/359, 377; 455/550.1, 561, 575.1; 702/92, 702/93, 94, 95, 96, 97, 150, 151, 152
See application file for complete search history.

(56) References Cited

U.S. PATENT DOCUMENTS

| 3,739,364 | A | 6/1973 | Talkington et al. |
| 6,677,896 | B2 * | 1/2004 | Singer et al. ................... 342/359 |
| 6,864,847 | B2 * | 3/2005 | Wensink ....................... 343/760 |
| 6,897,828 | B2 * | 5/2005 | Boucher ....................... 343/890 |
| 7,155,216 | B2 * | 12/2006 | Kiukkonen et al. .......... 455/423 |
| 7,280,195 | B2 | 10/2007 | Yoon et al. |

(Continued)

FOREIGN PATENT DOCUMENTS
EP     1501153 A1     1/2005
(Continued)

OTHER PUBLICATIONS

European search report for corresponding European application 07739419.5 lists the references above.

(Continued)

*Primary Examiner* — Nick Corsaro
*Assistant Examiner* — Michael S Bush
(74) *Attorney, Agent, or Firm* — DLA Piper US LLP

(57) ABSTRACT

In a base station device (10), a reference installation direction storage unit (54) stores at least one reference installation direction serving as a reference installation direction. An acceleration sensor (52) measures an installation direction of the base station device. An inclination judgment unit (56) calculates inclination angles each defined by each reference installation direction stored in the reference installation direction storage unit (54) and the installation direction measured by the acceleration sensor (52). Moreover, the inclination judgment unit (56) judges whether each of the inclination angles exceeds a predetermined value. Then, an installation error alarm unit (58) issues a predetermined alarm when the inclination judgment unit (56) judges that some or all of the inclination angles exceed the predetermined angle.

3 Claims, 5 Drawing Sheets

U.S. PATENT DOCUMENTS

| | | | |
|---|---|---|---|
| 7,760,233 B2 | 7/2010 | Kasai | |
| 2007/0229378 A1* | 10/2007 | Clark | 343/757 |

FOREIGN PATENT DOCUMENTS

| | | |
|---|---|---|
| JP | 07-273518 | 10/1995 |
| JP | 10-022900 | 1/1998 |
| JP | 2000278023 A | 10/2000 |
| JP | 2004286752 A | 10/2004 |
| JP | 2005-024668 | 1/2005 |
| JP | 2005184446 A | 7/2005 |
| JP | 2005-311995 | 11/2005 |

OTHER PUBLICATIONS

Korean language office action and its English language translation for corresponding Korean application 1020087023170 lists the reference above.

Japanese language office action dated Feb. 1, 2011 and its partial English language translation for corresponding Japanese application 2006089442 lists the references above.

* cited by examiner

BASE STATION DEVICE AND BASE STATION DEVICE INSTALLATION ERROR DETECTION METHOD

CROSS-REFERENCE TO THE RELATED APPLICATIONS

This application is a national stage of international application No. PCT/JP2007/055978 filed Mar. 23, 2007, which also claims the benefit of priority under 35 USC 119 to Japanese Patent Application No. 2006-089442 filed Mar. 28, 2006, the entire contents of which are incorporated herein by reference.

TECHNICAL FIELD

The present invention relates to a base station device and a base station device installation error detection method.

BACKGROUND ART

In many cases, compact, lightweight, and low-level-output base station devices for the personal handy-phone system (PHS) and the like are installed on electric poles, ceilings in train stations, or roofs of buildings. Further, in many cases, the base station devices are enclosed in a chassis to protect the base station devices from water such as rain and snow.

Patent Document 1 discloses a technique for a mobile telephone set having an Internet connecting function and an email sending and receiving function. The mobile telephone set includes means of one or more types for detecting an abnormal situation or an emergency situation, and receives and sends information on the detected abnormal situation or emergency situation. Patent Document 1: JP 2005-311995 A

DISCLOSURE OF THE INVENTION

Problems to be Solved by the Invention

The above-mentioned conventional base station devices may be unable to perform usual communications if the base station devices are installed in a direction different from a normal installation direction. For example, if such a base station device is installed at a wrong angle, the angle of an antenna element connected to the base station device shifts, changing the area covered by the base station device or degrading its communication characteristics in some cases. Further, even when the base station device is enclosed in a chassis, if the base station device is installed with a joint part facing upward, water such as rain may enter the base station device to cause a malfunction or an explosion at worst.

In view of the above-mentioned conventional problems, the present invention has been made, and therefore, it is an object of the present invention to provide a base station device and a base station device installation error detection method, capable of preventing an error in direction of installation.

Means for Solving the Problems

In order to solve the above-mentioned problems, a base station device according to the present invention includes: reference installation direction storage means for storing at least one reference installation direction serving as a reference installation direction for the base station device; installation direction measuring means for measuring an installation direction of the base station device; inclination judgment means for calculating inclination angles each defined by each reference installation direction stored in the reference installation direction storage means and the installation direction measured by the installation direction measuring means, and for judging whether each of the inclination angles exceeds a predetermined value; and installation error alarm means for issuing a predetermined alarm when the inclination judgment means judges that some or all of the inclination angles exceed the predetermined value.

Also, a base station device installation error detection method according to the present invention includes: a step of storing at least one reference installation direction serving as a reference installation direction for a base station device, in reference installation direction storage means; an installation direction measuring step of measuring an installation direction of the base station device; an inclination judgment step of calculating inclination angles each defined by each reference installation direction stored in the reference installation direction storage means and the installation direction measured in the installation direction measuring step, and of judging whether each of the inclination angles exceeds a predetermined value; and an installation error alarm step of issuing a predetermined alarm when it is judged, in the inclination judgment step, that some or all of the inclination angles exceed the predetermined value.

In the present invention, at least one reference installation direction serving as a reference installation direction for the base station device is stored in the base station device, and the installation direction of the base station device is measured. At this time, inclination angles each defined by each stored reference installation direction and the measured installation direction is calculated, respectively. It is judged whether each of the inclination angles exceeds a predetermined value. When it is judged that some or all of the inclination angles exceed the predetermined value, a predetermined alarm is issued. According to the present invention, an alarm is issued when the base station device is installed in a direction different from a normal installation direction (reference installation direction) stored in advance in the base station device, and hence an error in direction of installation can be prevented.

According to an aspect of the present invention, the installation direction is a direction of gravity acceleration with respect to the base station device. Therefore, the inclination angle of the base station device can be calculated based on a shift of the direction of gravity acceleration viewed from the base station device.

BEST MODE FOR CARRYING OUT THE INVENTION

Figure 1:
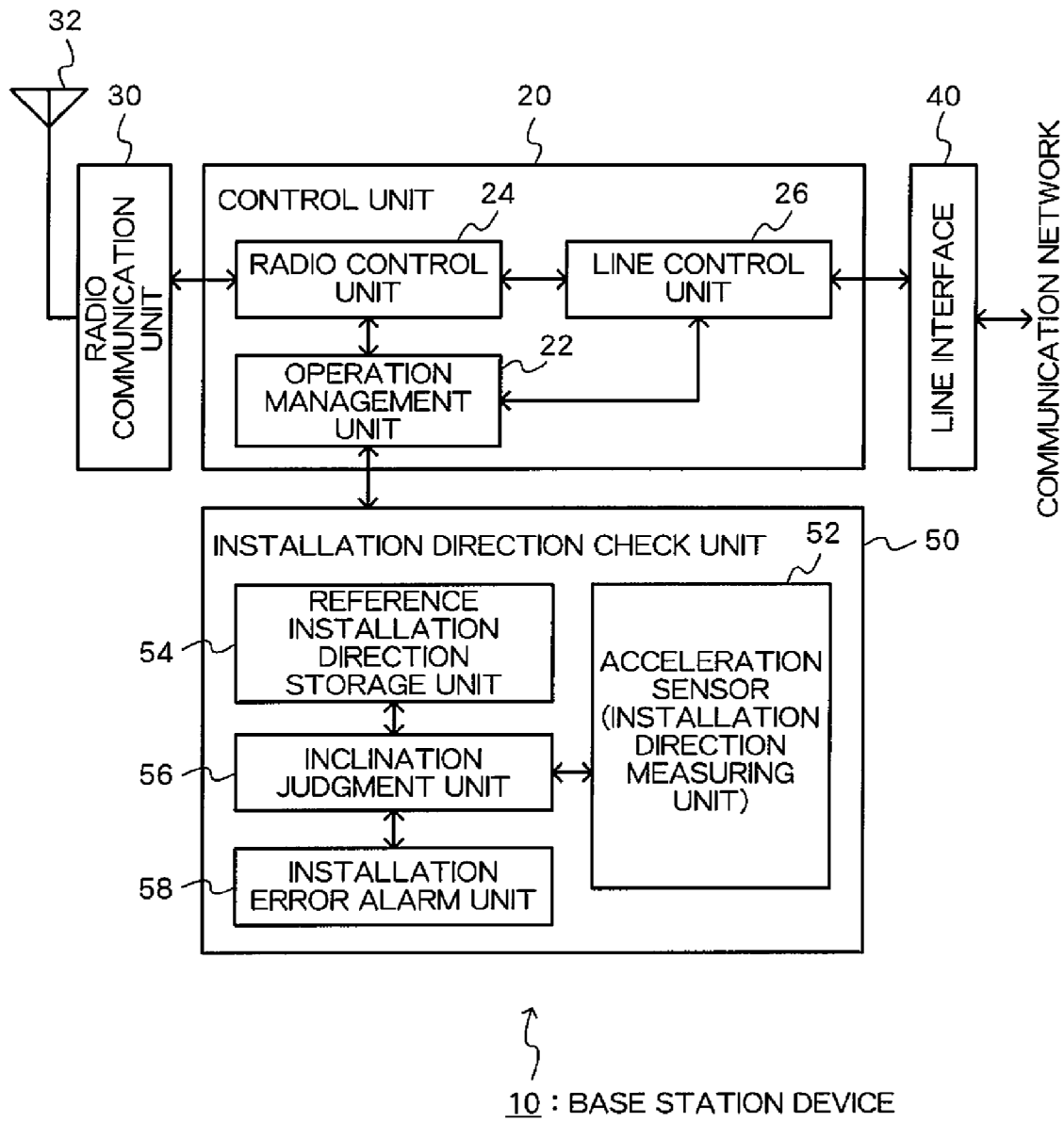
FIG. 1 is a functional block diagram of a base station device according to an embodiment of the present invention.

Hereinafter, an embodiment of the present invention will be described with reference to the drawings. FIG. 1 is a functional block diagram of a base station device 10. The base station device 10 includes a control unit 20, a radio communication unit 30, a line interface 40, and an installation direction check unit 50. The base station device 10 is installed on an electric pole, a ceiling in a train station, or a roof of a building, in many cases, and has one or more normal installation directions. Further, the base station device 10 is enclosed in a chassis to protect the base station device 10 from water such as rain and snow.

The control unit 20 includes an operation management unit 22, a radio control unit 24, and a line control unit 26, and is configured by a CPU, a memory, and the like. The operation management unit 22 is connected to the radio control unit 24, the line control unit 26, the installation direction check unit 50, and the like to control the entire operation of the base station device 10. The radio control unit 24 is connected to the radio communication unit 30 to control the radio communication unit 30 according to an instruction of the operation management unit 22. The line control unit 26 is connected to the line interface 40 to control the line interface 40 according to the instruction of the operation management unit 22.

The radio communication unit 30 includes an antenna 32, and is connected to the radio control unit 24 and also to the line interface 40 via the control unit 20. The radio communication unit 30 demodulates, according to an instruction of the radio control unit 24, a signal sent from each communication device and received by the antenna 32, separates and extracts packets from the signal, and outputs the packets to the line interface 40 via the control unit 20. Further, the radio communication unit 30 multiplexs and modulates multiple packets input from the line interface 40 via the control unit 20 and sends a modulated signal to each communication device via the antenna 32.

The line interface 40 is connected to the line control unit 26 and also to the radio communication unit 30 via the control unit 20, and links the base station device 10 and a communication network mutually. The line interface 40 outputs packets input from the communication network to the radio communication unit 30 via the control unit 20 according to the instruction of the line control unit 26. Further, the line interface 40 outputs multiple packets input from the radio communication unit 30 via the control unit 20 to the communication network.

The installation direction check unit 50 includes an acceleration sensor (installation direction measuring unit) 52, a reference installation direction storage unit 54, an inclination judgment unit 56, and an installation error alarm unit 58. The installation direction check unit 50 calculates the inclination angle of the base station device 10 with respect to a normal installation direction, and issues a predetermined alarm when the calculated inclination angle exceeds a predetermined value.

The acceleration sensor 52 measures the magnitude of acceleration applied to the object in which the acceleration sensor 52 is installed. For example, the acceleration sensor 52 can measure the magnitude and direction of gravity acceleration (gravity acceleration vector) to obtain the x-, y-, and z-direction components of the gravity acceleration vector in a coordinate system in which the acceleration sensor 52 serves as a reference. In this embodiment, the acceleration sensor 52 is fixed to the base station device 10 and measures each component of the gravity acceleration vector as the installation direction of the base station device 10. In order to reduce an error in measurement, the average value of gravity acceleration vectors measured at predetermined sampling intervals for a predetermined period of time may be used as the gravity acceleration vector. A measurement value of the acceleration sensor 52 is output to the inclination judgment unit 56. In the inclination judgment unit 56, the inclination angle of the base station device 10 is calculated based on the measurement value, as described later.

The reference installation direction storage unit 54 stores at least one reference installation direction of the base station device 10, in other words, at least one reference installation direction serving as a normal installation direction of the base station device 10. The reference installation direction is expressed by the x-, y-, and z-direction components of the gravity acceleration vector obtained when the base station device 10 is installed in the normal installation direction. For example, it is also possible that, at the time of manufacturing, before shipment of the base station device 10, or the like, the gravity acceleration vector is measured by the acceleration sensor 52 when the base station device 10 is installed in the normal installation direction, and the x-, y-, and z-direction components thereof are stored in the reference installation direction storage unit 54 as a reference installation direction.

Figure 2:
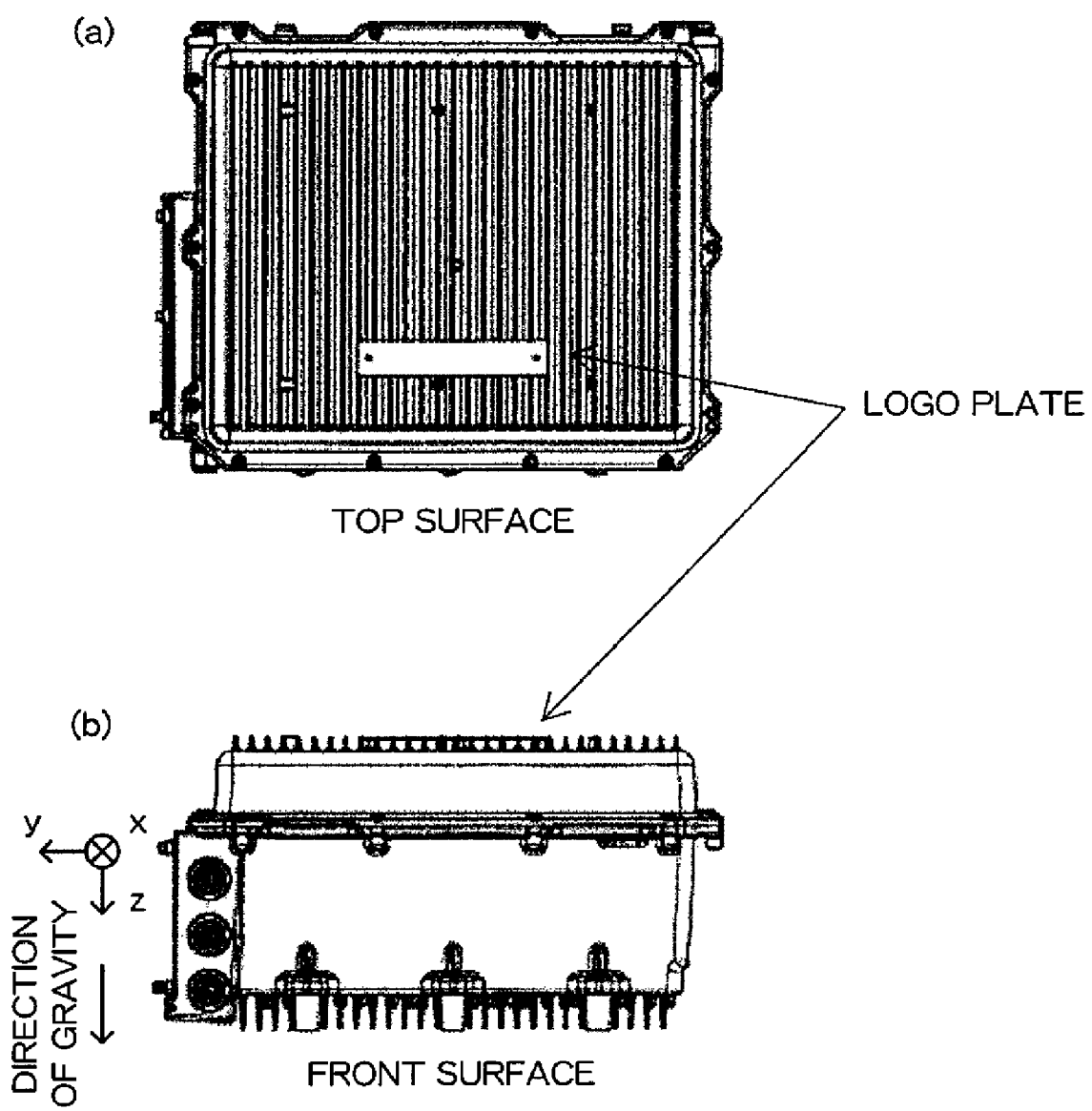
FIG. 2 are views illustrating appearances of the base station device and a normal installation direction.
Figure 3:
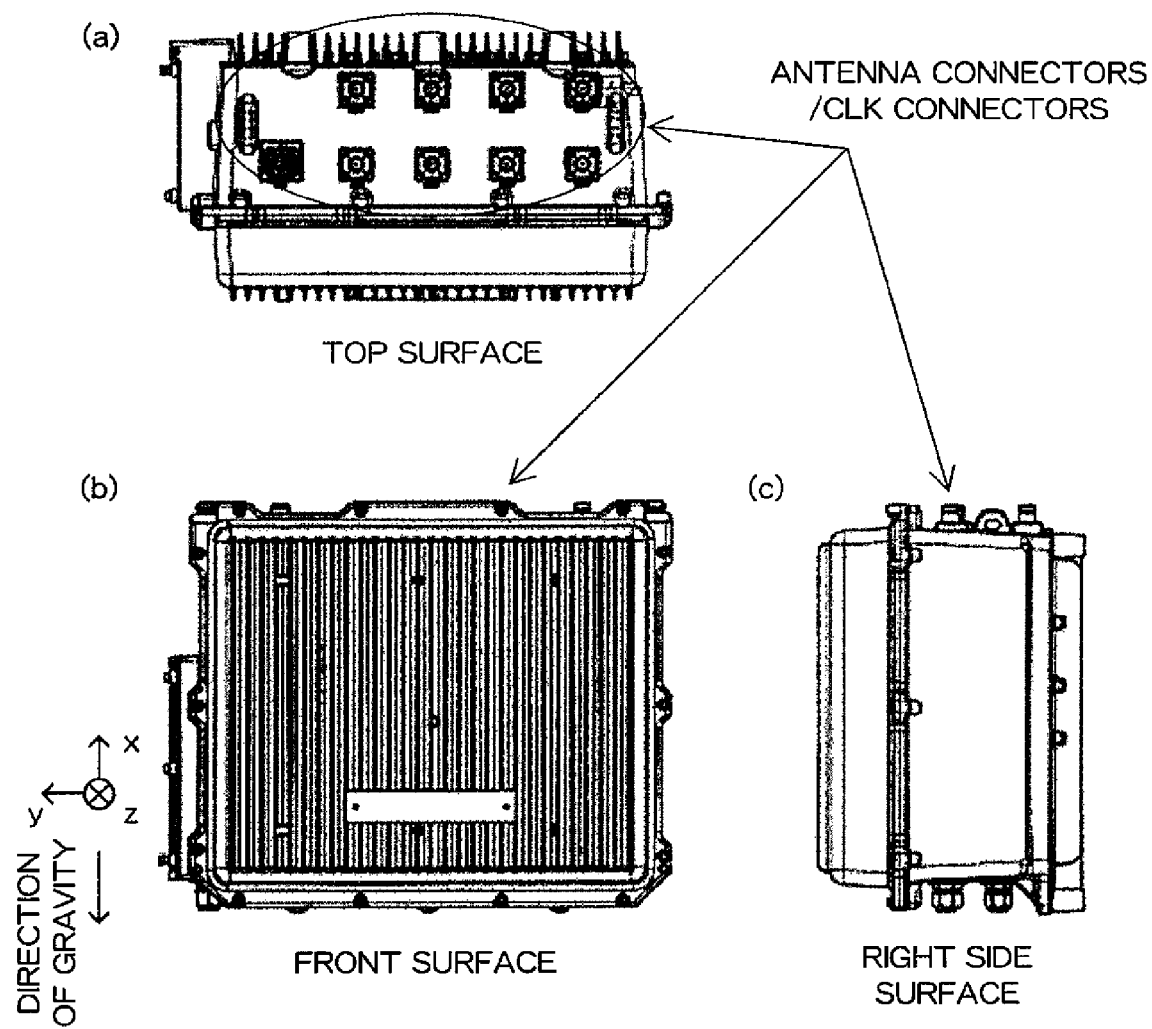
FIG. 3 are views illustrating appearances of the base station device and a normal installation direction.
Figure 4:
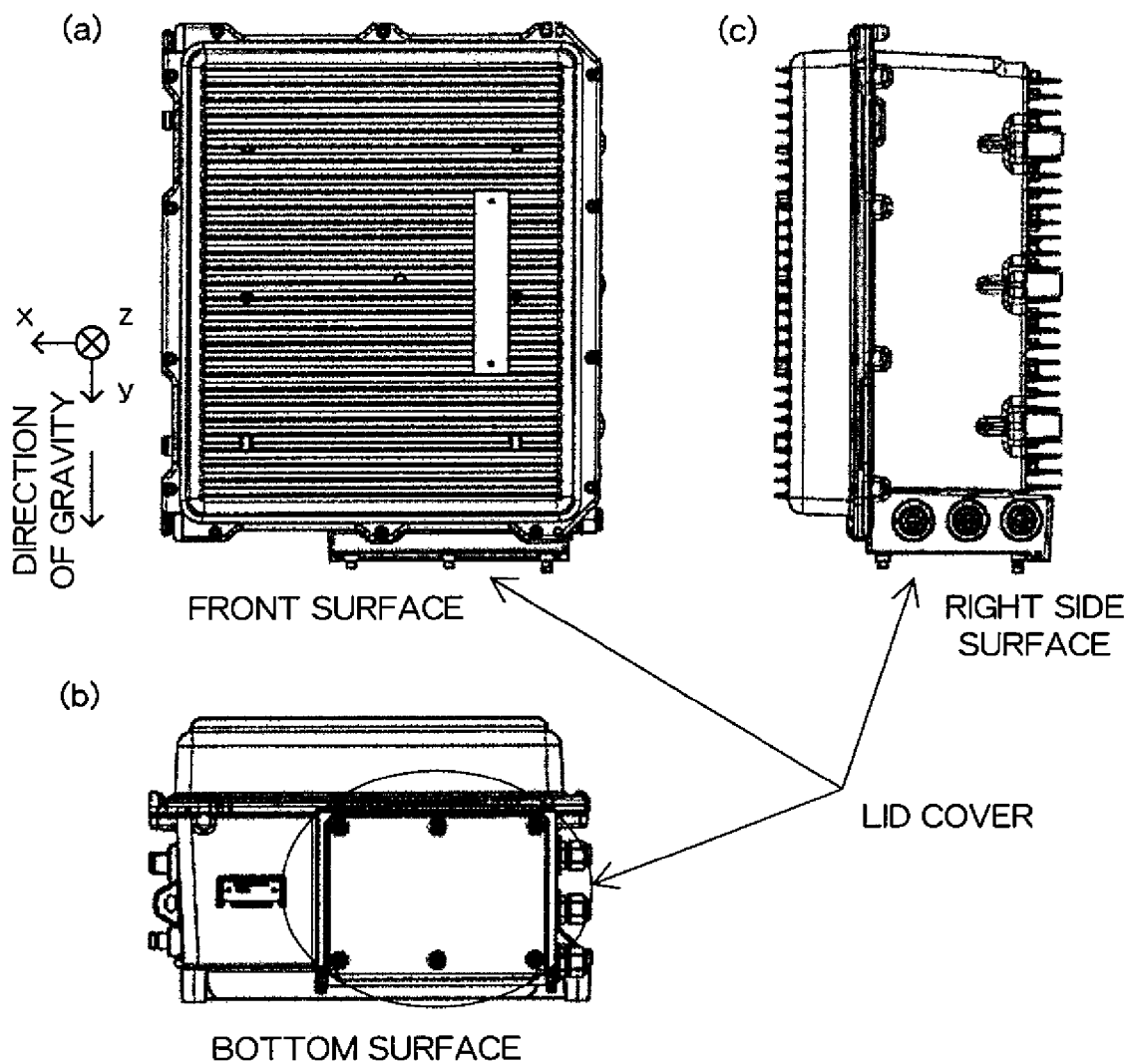
FIG. 4 are views illustrating appearances of the base station device and a normal installation direction.

FIGS. 2 to 4 are views illustrating appearances of the base station device 10 and normal installation directions. FIG. 2 illustrate a state where the base station device 10 is installed such that the logo plate of the base station device 10 faces upward. FIGS. 2(a) and 2(b) correspond to a top view of the base station device 10 and a front view thereof, respectively. The x, y, and z directions for the base station device 10 are defined as the rearward direction, the leftward direction, and the downward direction of the base station device 10, respectively, in the front view of FIG. 2(b) (the same applies to FIGS. 3 and 4). Since the gravity acceleration vector has the downward direction in the front view of FIG. 2(b), the installation direction of the base station device 10 is measured to obtain (x,y,z)=(0,0,1) in this case. The installation direction is expressed by a unit vector for ease of explanation. FIG. 3 illustrate a state where the base station device 10 is installed such that antenna connectors/CLK connectors of the base station device 10 face upward. FIGS. 3(a), 3(b), and 3(c) correspond to a top view of the base station device 10, a front view thereof, and a right side view thereof, respectively. Since the gravity acceleration vector has the downward direction in the front view of FIG. 3(b), the installation direction of the base station device 10 is measured to obtain (x,y,z)=(−1,0,0). FIG. 4 illustrate a state where the base station device 10 is installed such that the lid cover of the base station device 10 faces downward. FIGS. 4(a), 4(b), and 4(c) correspond to a front view of the base station device 10, a bottom view thereof, and a right side view thereof, respectively. Since the gravity acceleration vector has the downward direction in the front view of FIG. 4(a), the installation direction of the base station device 10 is measured to obtain (x,y,z)=(0,1,0) in this case.

The inclination judgment unit 56 judges whether the installation direction of the base station device 10 matches some or all of reference installation directions stored in the reference installation direction storage unit 54. Specifically, the inclination judgment unit 56 calculates the inclination angles each defined by each of the reference installation directions stored in the reference installation direction storage unit 54 and the installation direction measured by the acceleration sensor 52. When the inclination angle is expressed by $\theta$, the reference installation direction is expressed by $(x_0, y_0, z_0)$, and the installation direction measured by the acceleration sensor 52 is expressed by $(x,y,z)$, the inclination angle $\theta$ is obtained by the following formula.

$$\theta = \cos^{-1} \frac{x_0 x + y_0 y + z_0 z}{\sqrt{x_0^2 + y_0^2 + z_0^2} \sqrt{x^2 + y^2 + z^2}} \quad \text{[Formula 1]}$$

Then, the inclination judgment unit 56 judges whether each inclination angle calculated by the above-mentioned formula exceeds a threshold. Since the threshold is a value indicating an acceptable range for the inclination angle, when the threshold is set to a smaller value, the base station device 10 has to be installed in a more accurate direction.

The installation error alarm unit 58 issues a predetermined alarm when the inclination judgment unit 56 judges that some or all of inclination angles exceed the threshold, in other words, judges that the shift from the normal installation direction is large. For example, when only one installation direction illustrated in FIG. 2 is stored in the reference installation direction storage unit 54 as a reference installation direction and the threshold is set to a small value, if the base station device 10 is installed in a direction different from the normal installation direction illustrated in FIG. 3, an alarm is issued so as to prevent an error in direction of installation. Further, it is also possible that three installation directions illustrated in FIGS. 2 to 4 are stored in the reference installation direction storage unit 54 as reference installation directions, and the installation error alarm unit 58 issues an alarm only when all of three inclination angles each calculated by the inclination judgment unit 56 for each of the reference installation directions exceed the threshold. Therefore, an alarm is issued only when the base station device 10 is installed in a direction different from all of the installation directions illustrated in FIGS. 2 to 4.

Figure 5:
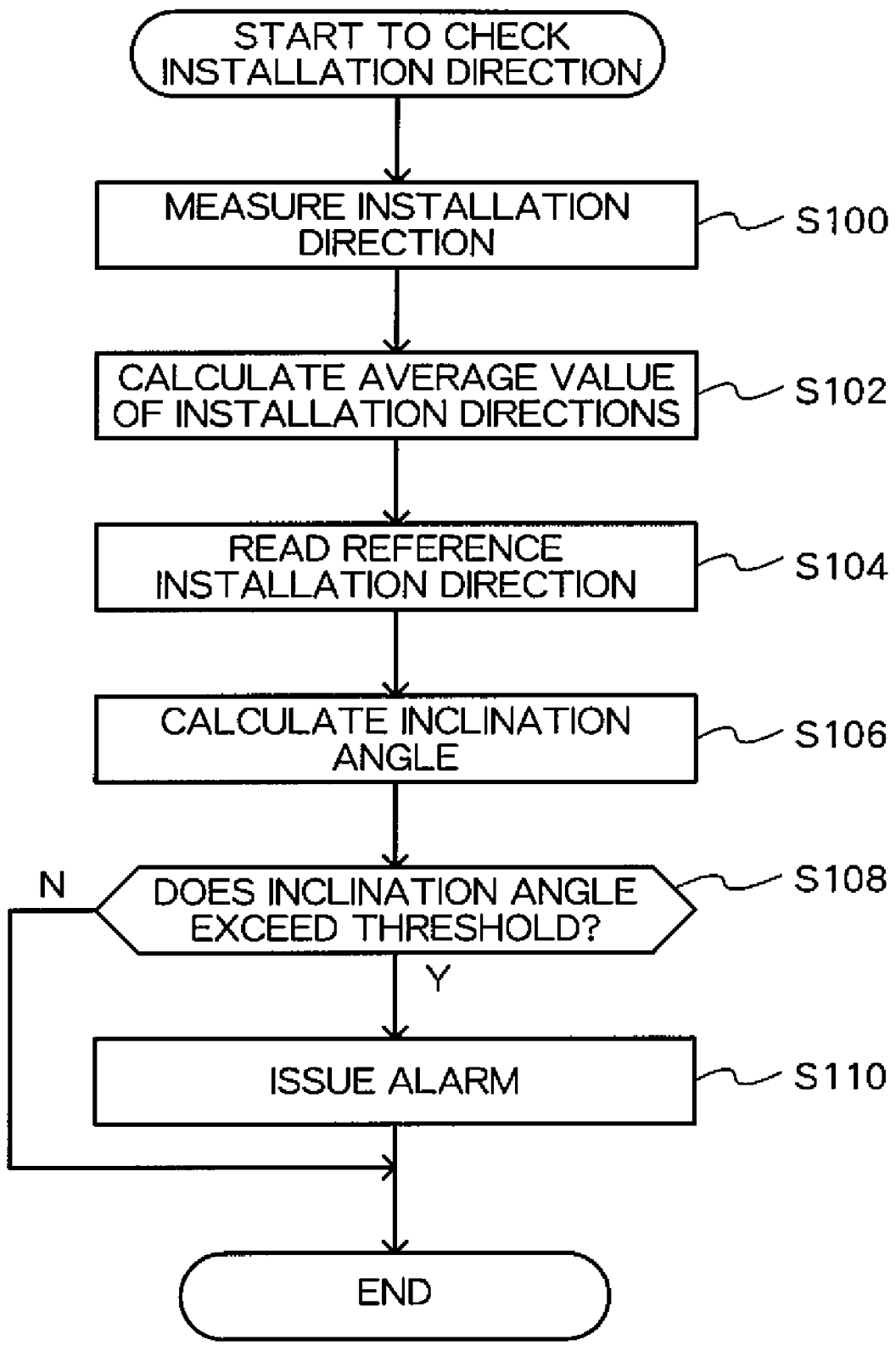
FIG. 5 is a flowchart illustrating an installation direction check process.

Next, a process to check the installation direction of the base station device 10 will be described with reference to a flowchart illustrated in FIG. 5. The process is performed to check whether the base station device 10 has been installed in a normal installation direction, and is usually activated with a button operation or the like by a worker who has installed the base station device 10 at the completion of installation.

When the process is activated, the acceleration sensor 52 measures an installation direction (gravity acceleration vector) at predetermined sampling intervals for a predetermined period of time (S100). Next, the inclination judgment unit 56 calculates the average value of multiple installation directions measured by the acceleration sensor 52, in order to reduce an error in measurement (S102). One or more reference installation directions each expressed by the gravity acceleration vector are read from the reference installation direction storage unit 54 (S104).

The inclination judgment unit 56 calculates the inclination angles each defined by each of the reference installation directions read in S104 and the installation direction obtained in S102 (S106), and judges whether each inclination angle exceeds a threshold (S108). When it is judged in S108 that some or all of the inclination angles exceed the threshold, in other words, when it is judged that the base station device 10 has not been installed in a normal installation direction, the installation error alarm unit 58 issues a predetermined alarm (S110), and the process ends. On the other hand, when it is judged in S108 that some or all of the inclination angles do not exceed the threshold, in other words, when it is judged that the base station device 10 has been installed in a normal installation direction, the process ends without issuing the alarm.

According to the above-mentioned base station device and base station device installation error detection method, an error in direction of installation for the base station device can be prevented.

Note that the present invention is not limited to the above-mentioned embodiment. For example, the acceleration sensor is used to measure the installation direction of the base station device in the embodiment, but any types of sensors (for example, a geomagnetic sensor) which can obtain information indicating a direction may be used instead of the acceleration sensor.

The invention claimed is:

1. A base station device, comprising:
   reference installation direction storage means for storing, before installing the base station device, at least one normal installation direction serving as a reference installation direction for the base station device;
   installation direction measuring means for measuring an installation direction of the base station device;
   inclination judgment means for calculating inclination angles defined by the reference installation direction stored in the reference installation direction storage means and the installation direction measured by the installation direction measuring means, and for judging whether each of the inclination angles exceeds a predetermined value; and
   installation error alarm means for issuing a predetermined alarm when the inclination judgment means judges that some or all of the inclination angles exceed the predetermined value.

2. A base station device according to claim 1, wherein the installation direction is a direction of gravity acceleration with respect to the base station device.

3. A base station device installation error detection method, comprising:
   a storing step of storing before installing the base station device at least one normal installation direction serving as a reference installation direction for a base station device, in reference installation direction storage means;
   an installation direction measuring step of measuring an installation direction of the base station device;
   an inclination judgment step of calculating inclination angles each defined by each reference installation direction stored in the reference installation direction storage means and the installation direction measured in the installation direction measuring step, and of judging whether each of the inclination angles exceeds a predetermined value; and
   an installation error alarm step of issuing a predetermined alarm when it is judged, in the inclination judgment step, that some or all of the inclination angles exceed the predetermined value.

\* \* \* \* \*